United States Patent
Kollesar et al.

(10) Patent No.: US 10,885,249 B1
(45) Date of Patent: Jan. 5, 2021

(54) MULTI-LEVEL HIERARCHICAL LARGE BLOCK SYNTHESIS (HLBS) LATCH OPTIMIZATION

(71) Applicant: International Business Machines Corporation, Armonk, NY (US)

(72) Inventors: Nany Kollesar, Poughkeepsie, NY (US); Shawn Kollesar, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/562,666

(22) Filed: Sep. 6, 2019

(51) Int. Cl.
| | |
|---|---|
| G06F 30/00 | (2020.01) |
| G06F 30/3312 | (2020.01) |
| G06F 30/327 | (2020.01) |
| G06F 30/392 | (2020.01) |
| G06F 30/394 | (2020.01) |
| G06F 30/398 | (2020.01) |

(52) U.S. Cl.
CPC ........ *G06F 30/3312* (2020.01); *G06F 30/327* (2020.01); *G06F 30/392* (2020.01); *G06F 30/394* (2020.01); *G06F 30/398* (2020.01)

(58) Field of Classification Search
CPC .. G06F 30/3312; G06F 30/394; G06F 30/327; G06F 30/398; G06F 30/392
See application file for complete search history.

(56) References Cited

U.S. PATENT DOCUMENTS

| | | | |
|---|---|---|---|
| 6,539,536 B1* | 3/2003 | Singh | G06F 30/30 |
| | | | 716/102 |
| 6,986,114 B2* | 1/2006 | Patzer | G01R 31/318586 |
| | | | 702/59 |
| 7,103,863 B2* | 9/2006 | Riepe | G06F 30/30 |
| | | | 716/113 |

(Continued)

OTHER PUBLICATIONS

Yoshikawa et al., "Timing Optimization by Replacing Flip-Flops to Latches" Proceedings of the 2004 Asia and South Pacific Design Automation Conference, IEEE Press, Jan. 2004, pp. 186-191.

(Continued)

*Primary Examiner* — Naum Levin
(74) *Attorney, Agent, or Firm* — Cantor Colburn LLP; William Kinnaman

(57) ABSTRACT

A system to develop an integrated circuit includes a child placement module that places in a parent macro a child macro that contains therein a child logic circuit component. The parent macro has a first hierarchical level assigned thereto and the child macro has a lower second hierarchical level assigned thereto. The system further includes a timing analysis module and a component targeting module. The timing analysis module detects a timing fault in response to performing a first parent-level optimization process on the parent macro. The component targeting module extracts from the child macro a targeted logic circuit component and places the targeted logic circuit component in the parent macro. The timing analysis module performs a second parent-level optimization process on the parent macro that resolves the timing fault based on the placement of the targeted logic circuit component in the parent macro.

20 Claims, 9 Drawing Sheets

(56) References Cited

U.S. PATENT DOCUMENTS

| | | | | |
|---|---|---|---|---|
| 7,823,107 | B2* | 10/2010 | Arsovski | G06F 30/327 |
| | | | | 716/113 |
| 8,381,150 | B2* | 2/2013 | Zolotov | G06F 8/20 |
| | | | | 716/108 |
| 8,443,317 | B2* | 5/2013 | Hiraoglu | G06F 30/3323 |
| | | | | 716/107 |
| 8,516,412 | B2 | 8/2013 | Cho et al. | |
| 8,589,837 | B1* | 11/2013 | Baumgartner | G06F 30/327 |
| | | | | 716/104 |
| 8,832,608 | B1* | 9/2014 | Chakrabarty | G06F 30/327 |
| | | | | 716/51 |
| 10,303,648 | B1* | 5/2019 | Das | G06F 15/8007 |
| 10,467,365 | B1* | 11/2019 | Kulshreshtha | G06F 30/34 |
| 10,558,775 | B2* | 2/2020 | Kim | G06F 30/39 |
| 2002/0087939 | A1* | 7/2002 | Greidinger | G06F 30/394 |
| | | | | 716/122 |
| 2004/0216064 | A1 | 10/2004 | Gass | |
| 2007/0245281 | A1 | 10/2007 | Riepe et al. | |
| 2012/0124541 | A1 | 5/2012 | Amundson et al. | |
| 2013/0239075 | A1 | 9/2013 | Gaugler et al. | |
| 2019/0026418 | A1* | 1/2019 | Kim | G06F 30/392 |
| 2019/0188352 | A1* | 6/2019 | Kim | G06F 30/39 |

OTHER PUBLICATIONS

Transmittal Form PTO/SB/21, filed Mar. 18, 2020.

* cited by examiner

MULTI-LEVEL HIERARCHICAL LARGE BLOCK SYNTHESIS (HLBS) LATCH OPTIMIZATION

BACKGROUND

The present invention relates to an optimization phase of integrated circuit development, and more specifically, to optimizing latch placements in an integrated circuit.

The process of creating an integrated circuit (IC), referred to as very large scale integration (VLSI) or chip design, includes many steps, some of which are repeated iteratively. Generally, combinational logic gates and memory elements (i.e., latches, flip-flops, logic gates, etc.) are integrated into a process referred to as logic synthesis to implement the desired functionality of the IC. One of the results of the logic synthesis is a netlist that defines the connectivity among the various logic gates and memory elements that make up the IC.

This logic synthesis is ultimately transitioned into a layout of physical components in an arrangement that considers the timing, congestion, and power usage constraints of the IC design. Processes that are performed as part of this transition from the logic design to the physical layout are referred to as physical synthesis. Physical synthesis includes placement (i.e., defining the location of cells), clock and timing optimization (i.e., ensuring that timing constraints are met based on the location of cells and the resulting wire lengths of interconnects), and routing (i.e., defining paths for the wires interconnecting cells). The goal of physical synthesis is to generate a layout that meets timing, congestion, and power metrics. Once synthesized, a given child macro (sometimes referred to as a synthesized macro) can be flattened into higher-level hierarchy (sometimes referred to as the parent macro), which allows the placements and routing connections of the flattened child macro to be considered when performing parent-level optimization processes.

SUMMARY

According to a non-limiting embodiment, a method of developing an integrated circuit includes placing in a parent macro, via a computer processor, at least one child macro that contains therein at least one child logic circuit component. The parent macro has a first hierarchical level assigned thereto and the child macro has a second hierarchical level assigned thereto that is lower than the first hierarchical level assigned to the parent macro. The method further includes detecting, via the computer processor, a timing fault in response to performing a first parent-level optimization process on the parent macro, and extracting from the child macro, via the computer processor, a targeted logic circuit component from among the at least one child logic circuit component, and placing the targeted logic circuit component in the parent macro. The method further includes performing a second parent-level optimization process on the parent macro that resolves the timing fault based on the placement of the targeted logic circuit component in the parent macro.

According to another non-limiting embodiment, a system to develop an integrated circuit includes a child placement module configured to place in a parent macro at least one child macro that contains therein at least one child logic circuit component. The parent macro has a first hierarchical level assigned thereto and the child macro has a second hierarchical level assigned thereto that is lower than the first hierarchical level assigned to the parent macro. The system further includes a timing analysis module and a component targeting module. The timing analysis module is configured to detect a timing fault in response to performing a first parent-level optimization process on the parent macro. The component targeting module is configured to extract from the child macro a targeted logic circuit component from among the at least one child logic circuit component, and to place the targeted logic circuit component in the parent macro. The timing analysis module performs a second parent-level optimization process on the parent macro that resolves the timing fault based on the placement of the targeted logic circuit component in the parent macro.

A computer program product for developing an integrated circuit, the computer program product comprising a computer readable storage medium having program instructions embodied therewith, the program instructions executable by a processor to perform a method comprising placing in a parent macro, via a computer processor, at least one child macro that contains therein at least one child logic circuit component. The parent macro has a first hierarchical level assigned thereto and the child macro has a second hierarchical level assigned thereto that is lower than the first hierarchical level assigned to the parent macro. The method further includes detecting, via the computer processor, a timing fault in response to performing a first parent-level optimization process on the parent macro, and extracting from the child macro, via the computer processor, a targeted logic circuit component from among the at least one child logic circuit component, and placing the targeted logic circuit component in the parent macro. The method further includes performing a second parent-level optimization process on the parent macro that resolves the timing fault based on the placement of the targeted logic circuit component in the parent macro.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
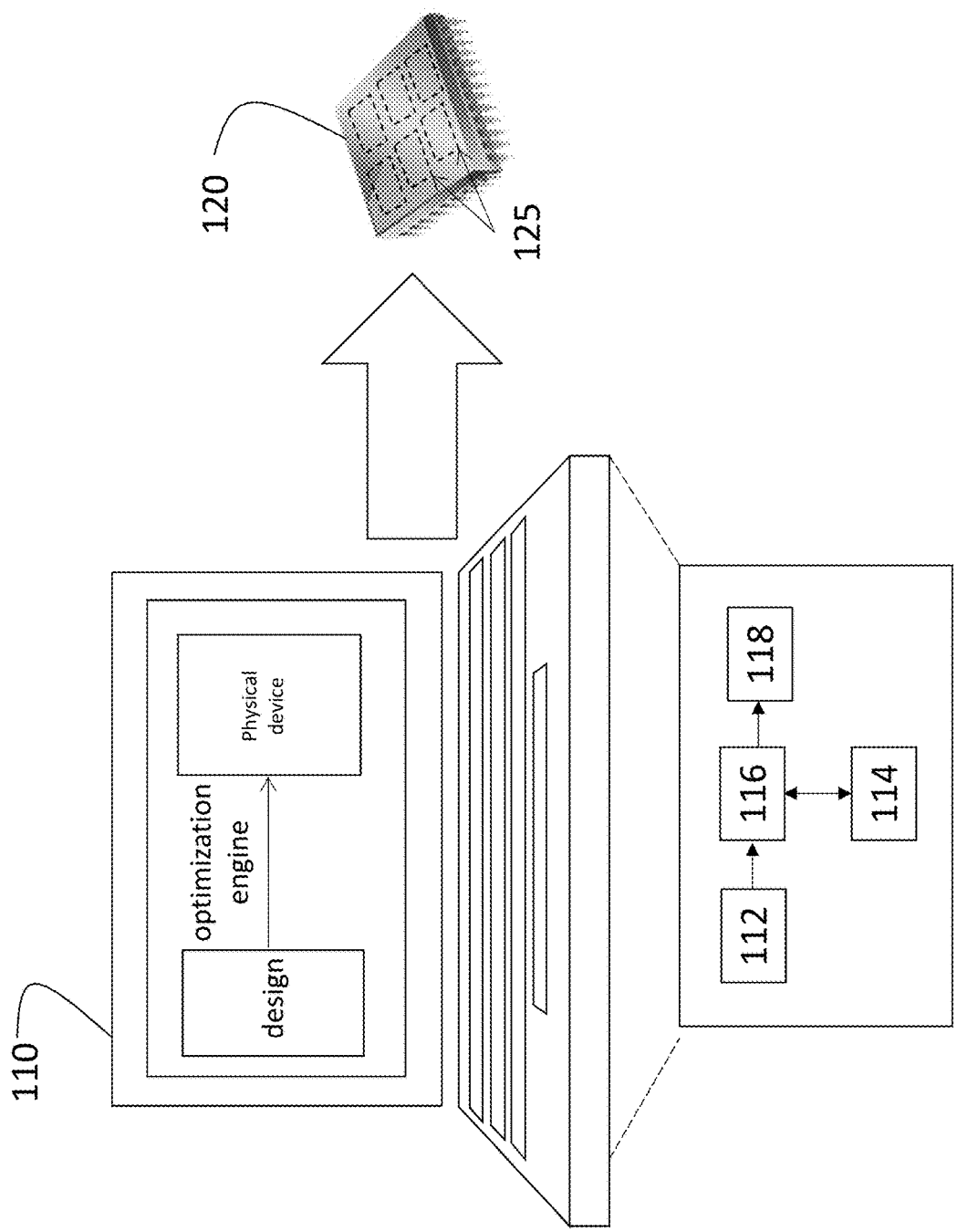
FIG. 1 is a block diagram of a physical synthesis system configured to straighten critical paths in a physical synthesis process according to a non-limiting embodiment of the invention.

Current microprocessor trends include integrating traditionally custom designs with random logic macros (RLMs) into very large integrated circuit designs. In some cases, entire microprocessor units are designed using an automated synthesis flow that integrates these traditional custom designs and RLMs. This type of merged synthesis run is referred to as large block synthesis (LBS). The LBS blocks, i.e., sets of cells or logic modules, require handling dataflow designs differently than traditional RLMs. In this process, the entire logic is usually flattened out, and timing-critical logic portions can be pre-optimized in order to improve the overall result. This pre-optimization uses multiple copies (instances) of the same block of logic whose cells have already been placed and routed. These hard-bounded blocks are fed into the flat synthesis.

Turning now to an overview of technologies that are more specifically relevant to aspects of the invention, a particular type of LBS referred to as hierarchical large block synthesis (hLBS) involves performing a 2-step process that transforms a unit into a synthesized super-large block. First, macros are synthesized and then a higher-level unit integration level is synthesized, which includes pre-synthesized macros, and sometimes flattening these macros to this top level. The placement of child logic circuit elements such as latches (i.e., latches placed in child blocks at the child level as opposed to the higher parent level) is generally predetermined based on slack and pin location.

Conventional LBS design includes multiple level of hierarchies, where each level of hierarchy is designed and optimized out of context, and within its own physical boundary. Optimizing a child block "out-of-context" refers to optimizing the components within a given child block, without considering the components of the higher-level unit, i.e., out-of-context with respect to the parent block. Generally, such hierarchical boundaries sometimes prevent a designer from reaching a solution that is optimal with respect to the whole design, and can present various inefficiencies in a design. For example, hierarchical boundaries may cause imbalances in the timing between latches of different levels and/or suboptimal latch timings.

A particular type of LBS referred to as Hierarchical Large Block Syntheses (hLBS) allows for lifting restrictions requiring latches to remain inside their own boundary, i.e., within a given child block or macro. In this manner, the overall hLBS design can be optimized.

Turning now to an overview of the aspects of the invention, one or more embodiments of the invention achieve an optimized logic circuit element placement in hLBS by pulling out or extracting a targeted logic circuit element out of its respective child block or macro in an hLBS after it has been placed and then balancing the timing between logic circuit elements based on optimization of a higher-level hierarchy taking into account factors such as timing, routing, etc. The higher level of hierarchy is better equipped to balance timing on latches and to use latch placement to alleviate congestion. A child macro is first built in the hLBS and then timing is tested. If timing violations are detected (i.e., a signal fails to travel from one latch to another within a threshold amount of time), logic circuit element placement optimization is first performed within the child macro and if timing violations still persist then a targeted child logic circuit element (e.g., child latch) is pulled out of the child macro, placed into its corresponding higher-level parent macro, and latch placement optimization is performed at the higher-level parent level (sometimes referred to as the hLBS level), which at this time takes into account the newly placed extracted logic circuit element. Although latches are described going forward, the extraction and optimization methods described herein can be performed on other types of logic circuit elements (e.g., flip-flops, logic gates, etc.) without departing from the scope of the invention.

With reference now to FIG. 1, a physical synthesis system 100 configured to perform out-of-context feedback optimization on a physical design such as a semiconductor chip, for example, is illustrated according to a non-limiting embodiment. The physical synthesis system 100 includes a processing system 110 (e.g., computer) that implements one or more computer processors such as, for example, an electronic hardware synthesis controller 116 that controls one or more synthesis modules or engine. An input interface 112 (e.g., keyboard, mouse) may be used to develop the logic design which is stored in one or more memory devices 114 of the processing system 110. An output interface 118 (e.g., display, output port) displays a graphical layout or design resulting from the synthesis and/or provides information to place and route components of the physical implementation 120 (e.g., chip). The information includes, but is not limited to, the logic circuit element placement (e.g., latch placement location, gate placement location, etc.), critical paths, critical gates on the critical path, anchor points, component locations with respect to one or more critical paths, and potential free-space locations, highlighted or emphasized ideal free-space location(s) with respect to a critical path(s) and existing components, and slack benefit values with respect to given free-space.

A slack benefit is a value indicating an improvement or degradation in slack timing provided by relocating a gate to a free-space. For instance, a critical path can include at least one gate coupled thereto that defines an initial slack timing value. Relocating the gate to a free-space may either improve the slack timing or degrade the slack timing. Thus, the slack benefit is essentially the amount of time (e.g., +/−picoseconds) by which the slack time is modified with respect to the initial slack timing.

The physical implementation 120 includes creating components (e.g., transistors, resistors, capacitors) and interconnections between them on a semiconductor (e.g., silicon wafer). The physical layout of circuit sub-blocks 125 affects the length of a connecting wire between components and, thus, the timing of signals between them, for example.

Figure 2:
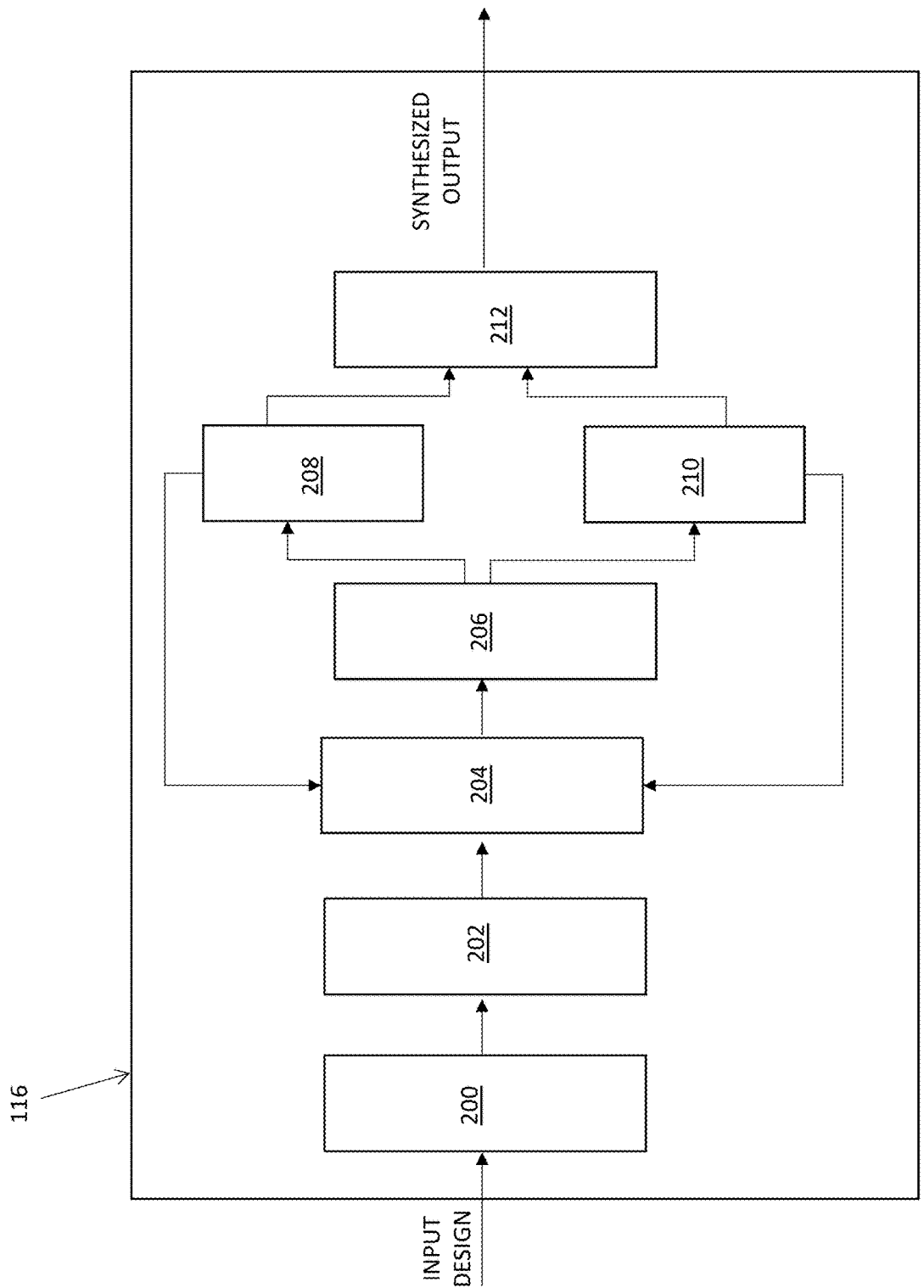
FIG. 2 is a block diagram of a physical synthesis controller included in the physical synthesis system illustrated in FIG. 1 according to a non-limiting embodiment of the invention.

The synthesis controller 116 can include one or more individual sub-modules or sub-controllers that execute a respective physical synthesis operation. In at least one non-limiting embodiment illustrated in FIG. 2, the synthesis controller 116 includes a child component placement module 200, a child macro placement module 202, a timing analysis module 204, a component targeting module 206, and a flattening module 208, a morphing module 210, and a file generator module 212. Although FIG. 2 illustrates separate individual modules 200-212, it should be appreciated that one or more of the modules 200-212 can be implemented together into a common or single module/controller. In addition, each module 200-212 can be constructed as an individual hardware controller that executes algorithms, control logic, etc., stored in a respective memory unit to execute the respective synthesis operations of the given module.

The child component placement module 200 is configured to place and route the layout of various logic circuit components within the boundaries of a given child macro. The various logic circuit components include, but are not limited to, latches, flip-flops, and logic gates. The logic circuit components are placed and routed out of context with respect to the parent macro designed to contain the child macro. That is, the child component placement module 200 places and routes the logic circuit components within the boundaries of their respective child macro and without consideration of the layout and design of the higher-level parent macro intended to contain the child macro.

After completing the initial layout of the child logic circuit components in their respective child macro, the child macro placement module 202 places the child macro within its intended parent macro. The child macro placement module 202 can determine the placement of a given child macro based on the location of other child macros, input/output (I/O) pads and/or free spaces within the parent macro. In one or more embodiments, flylines (also referred to as flight lines) can be used to place the child macros in their respective parent macros. Flylines are virtual connections that can assist in evaluating logical connections between a pair of child macros and/or between a child macro and I/O pads.

The timing analysis module 204 performs timing analysis on a given child macro and/or a given parent macro. The timing analysis can include performing a static timing analysis on a child macro and/or a parent macro. In one or more embodiments, the timing analysis module can identify one or more critical paths, which are defined as routing paths between logic circuit components (e.g., an input latch and an output latch) having a maximum time delay. In one or more embodiments, the timing analysis can utilize an arrival time analysis, a required time analysis and/or a slack analysis to perform a traceback method that identifies a given critical path.

The arrival time analysis is based on an arrival time of a signal, which is defined as the time elapsed for a signal to arrive at a certain point. The reference, or time 0.0, is often taken as the arrival time of a clock signal. To calculate the arrival time, delay calculation of all the components in the path will be required. Arrival times, and indeed almost all times in timing analysis, are normally kept as a pair of values—the earliest possible time at which a signal can change, and the latest.

The required time analysis is based on a latest time at which a signal can arrive without making the clock cycle longer than desired. The computation of the required time proceeds as follows: at each primary output, the required times for rise/fall are set according to the specifications provided to the circuit. Next, a backward topological traversal is carried out, processing each gate when the required times at all of its fanouts are known.

The slack analysis is based on a slack associated with each connection or each logic circuit component (e.g., each latch). The slack is the difference between the required time and the arrival time. A positive slack (+s) at a given block (e.g., a given latch) indicates that the arrival time at that block may be increased by s, without affecting the overall delay of the circuit. Conversely, negative slack (−s) indicates that a path is too slow, and the path must be sped up (or the reference signal delayed) if the circuit in its current design is to work at a desired or targeted speed.

In one or more embodiments of the invention, the timing analysis module 204 first performs a timing analysis on a given child macro out of context with respect to the parent macro. If a timing violation or timing imbalance is detected, one or more logic circuit components (e.g., latches) can be relocated within the boundaries of its child macro until the timing violation is resolved or the timing becomes balanced. However, a timing violation or timing imbalance may be detected when the timing analysis module 204 performs a subsequent timing analysis on the overall parent macro. Accordingly, one or more child logic circuit components (e.g., child latches) can be extracted from its child macro and placed into a higher-level parent macro. The timing analysis module 204 can then perform a timing analysis module 204 on the parent macro, which at this time now takes into account the extracted logic circuit component (e.g., the extracted latch). Accordingly, the placement of the extracted latch can be continuously adjusted at the higher-level parent macro until the parent-level timing violation is resolved or the timing becomes balanced. The extraction of a child logic circuit component from its child macro is described in greater detail below.

The component targeting module 206 is configured to identify one or more logic circuit components (e.g., a latch) associated with a detected timing violation or timing imbalance, and to target one or more of the identified logic circuit components for extraction from the child macro. In one or more embodiments of the invention, the slack of a latch associated with a routing path detected to have a timing violations can be utilized to determine whether it is a candidate to be extracted from the child macro. For example, a latch having a positive slack on one side, but a negative slack on the other can be targeted as a latch to be extracted from its child macro and placed into a higher-level parent macro so that it can be placed in a more balanced location to resolve the detected timing violation without affecting the overall delay of parent macro. When one or more child logic circuit components are targeted, the targeted child logic component (e.g., a targeted latch) can be extracted using the flattening tool or the morphing tool based on the location of the child macro.

When the child macro is located in a general hLBS level, the component targeting module 206 can output a child macro identification (ID) signal to the flattening module 208 identifying the particular child macro containing the targeted child logic circuit component to be extracted, along with identifying the parent macro at which to flatten the child macro. The flattening module 208 will perform a flattening operation that flattens the entire contents of the identified child macro into the identified parent macro, thereby placing the targeted logic circuit component (e.g., the targeted latch) into the higher-level parent macro.

When, however, the child macro is located in a core level, the component targeting module 206 output a child component ID signal to the morphing module 210. This is because at the highest levels of hierarchy there are only large logical blocks, and select smaller cells (e.g. latches), and the optimization algorithms are tailored to such a design, and don't handle placing and optimizing many small logic gates well. In this case, the child component ID signal identifies the particular child logic circuit component to be extracted from its respective child macro, along with identifying the parent macro at which to place the extracted logic circuit component. The design layout generation method presented herein is inspired by image morphing techniques in signal processing, and hence is referred to as "layout morphing." The morphing process preserves the correspondence between certain features from the source layout to the destination layout through the morphing. In other words, unlike the flattening operation performed by the flattening module 208, the targeted logic circuit component is extracted from the child macro and placed in the parent macro, while the non-targeted components remain within the boundaries of their child macro.

Once the targeted child component is placed into the higher-level parent macro (e.g., either by the flattening operation or the morphing operation), the new layout of the hLBS is fed back to the timing analysis module 204. Accordingly, the timing analysis module 204 can perform a timing analysis on the parent macro, which at this time now takes into account the extracted logic circuit component (e.g., the extracted latch). The placement of the extracted latch can be continuously adjusted at the higher-level parent macro until the timing analysis module 204 determines that the parent-level timing violation is resolved or the timing is balanced. At this time, the hLBS can be viewed as being optimized.

Once optimized, a netlist of the hLBS layout can be generated by the file generator module 212, and a synthesized output can be delivered to the output interface 118 (see FIG. 1) to finalize the design. The synthesized output can include, for example, a data file defining a synthesized implementation of the parent macro containing a physical implementation of the targeted logic circuit component. The finalized design defined by the synthesized output can then be utilized to facilitate fabrication of the physical implementation 120 (e.g., to fabricate a physical chip).

In addition to the synthesis operations described above, it should be appreciated that various other synthesis operations can be performed to further optimize the hLBS. For example, the synthesis controller 116 may perform voltage threshold (Vt) assignments buffer assignments, and/or layer adjustments, including simultaneous layer assignments of each net connected to a relocated latch, may per performed such that the overall timing closure is further improved.

As described herein, the synthesis controller 116 allows for achieving an optimized latch placement in hLBS by pulling or extracting a latch out of its respective child block or macro in an hLBS after it has been placed and balance the timing between latches based on optimization of a higher-level hierarchy taking into account factors such as timing, routing, etc. The ability to extract the latch from its original child macro and place it into a higher-level parent macro to be considered when performing the parent optimization test achieves a multi-level optimization that is not performed by conventional hLBS optimization processes.

Figure 3:
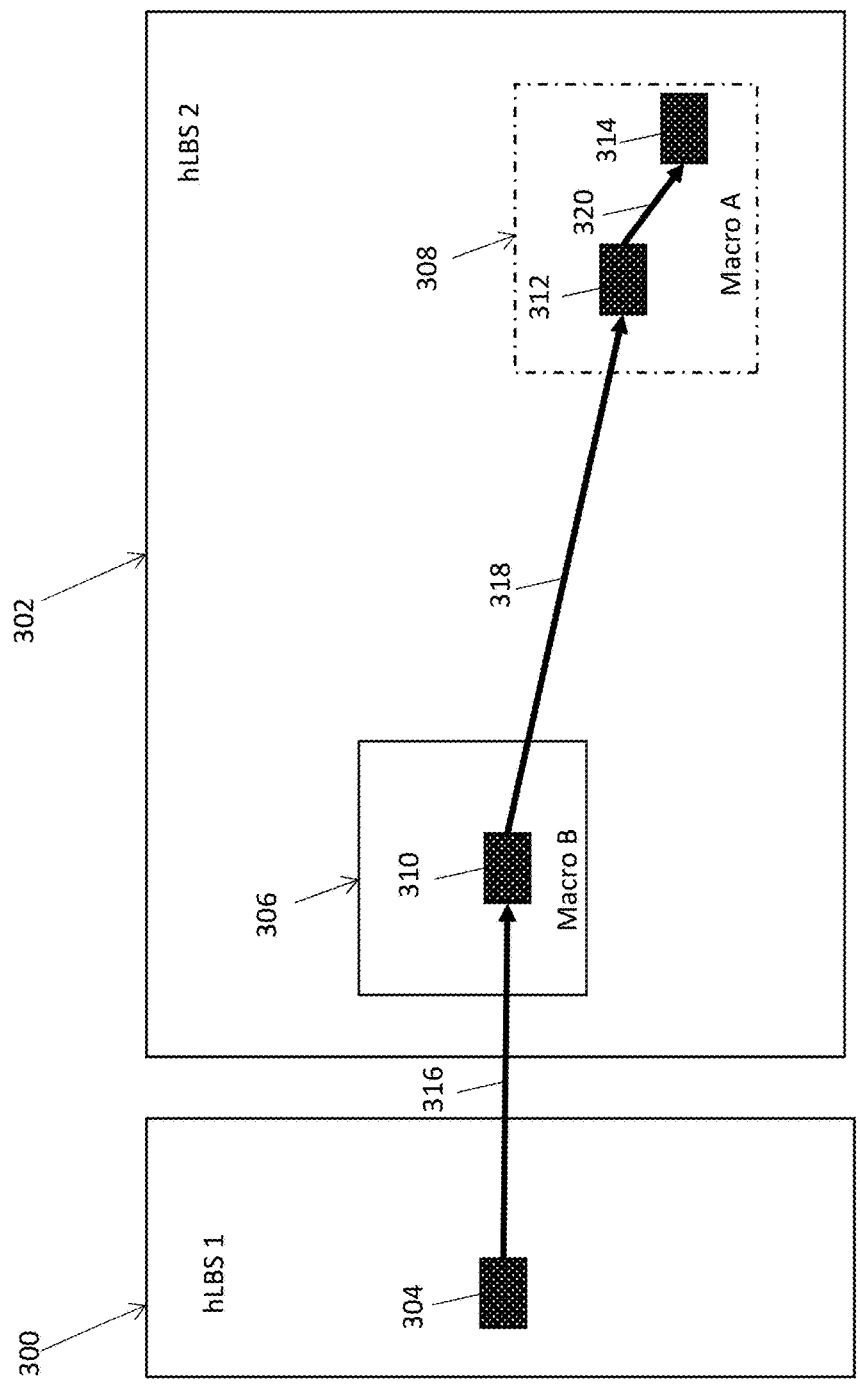
FIG. 3 depicts a first arrangement of placed latches in a Hierarchical Large Block Syntheses (hLBS) according to a non-limiting embodiment of the invention.
Figure 4:
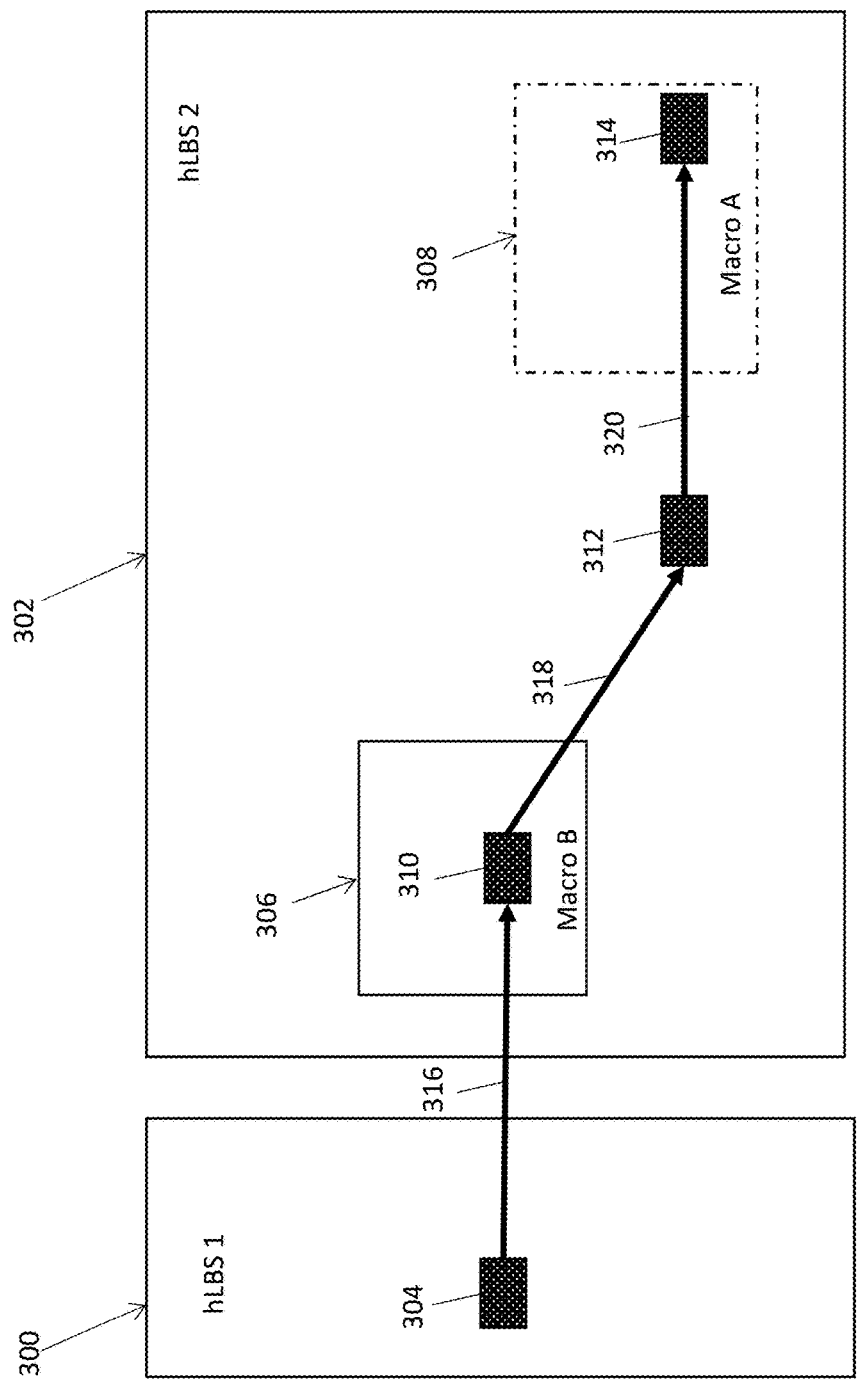
FIG. 4 depicts a second arrangement of placed latches in the hLBS after moving a latch from a child macro to a higher-level parent macro according to a non-limiting embodiment of the invention.

FIGS. 3 and 4 illustrate an example of pulling out or extracting a latch out of its respective child block or child macro and placing it into its corresponding higher-level parent macro. Although a latch is described, it should be appreciated that the operations can be applied to other types of circuit logic components (e.g., flip-flops, logic gates, etc.) without departing from the scope of the invention.

Referring first to FIG. 3, two different parent level hLBSs 300 and 302 are shown. The first parent-level hLBS 300 includes a first latch 304. The second parent-level hLBS 302 includes two individual child macros 306 and 308. The first child macro 306 includes a first child latch 310 placed therein. The second child macro 308 includes a second child latch 312 and a third child 314 placed therein. The first child latch 310 is placed out of context with respect to the second child latch 312 and third child 314 latch. In addition, the first child latch 310 of the first child macro 306, along with the second and third child latches 312 and 314 of the second child macro 308 are placed out of context with respect to parent macros 300 and 302.

The child macros 306 and 308 are placed in their respective parent macro 302 and the latches 304, 310, 312 and 314 are connected via routing paths. For example, a first routing path 316 connects the first latch 304 included in the first parent macro 300 to the first child latch 310 included in the first child macro 306 of second parent macro 302. A second routing path 318 connects the first child latch 310 to the second child latch 312 included in the second child macro 308 of second parent macro 302. A third routing path 320 connects the second child macro latch 312 to the third child latch 314 included in the second child macro 308.

Following placement of the child macros 306 and 308 in their respective parent macro 302, an optimization test is performed on the parent macros 300 and/or 302. Accordingly, the optimization test may determine that a timing fault is present at routing path 318, which connects the first child latch 310 and the second child latch 312. For instance, FIG. 3 shows that the distance of the routing path 318 that connects the first child latch 310 placed in the first child macro 306 to the second child latch 312 placed in the second child macro 308 is greater than the routing path 320 connecting the second and third child latches 312 and 314 placed in the second child macro 308. This difference in routing lengths can cause the timing imbalance detected when optimizing the second parent macro 302. Based on the optimization test, a target child macro (e.g., child macro 308) can be identified (indicated by the dashed outline) as having one or more child latches to be extracted therefrom and placed into its higher-level parent macro (e.g., parent macro 302).

Turning to FIG. 4, the second parent macro 302 is illustrated after extracting the second child latch 312 from its originally placed child macro 308 (see FIG. 3). In other words, the second child latch 312 is pulled out of the second child macro 308 and placed into the higher-level second parent macro 302. Further, the second child latch 312 is placed such that the length of the second routing path 318 and the length of the third routing path 320 are brought closer in line to one another, e.g., the lengths of the first and second routing paths 318 and 320 match or substantially match one another. In other words, adjusting the placement of the second child latch 312 also modifies the lengths of the second routing path 318 and the third routing path 320. In this manner, the second child latch 320 can be extracted from its original child macro so that the previous timing imbalance can be resolved, e.g., the first and second routing paths 318 and 320 can be balanced.

Figure 5:
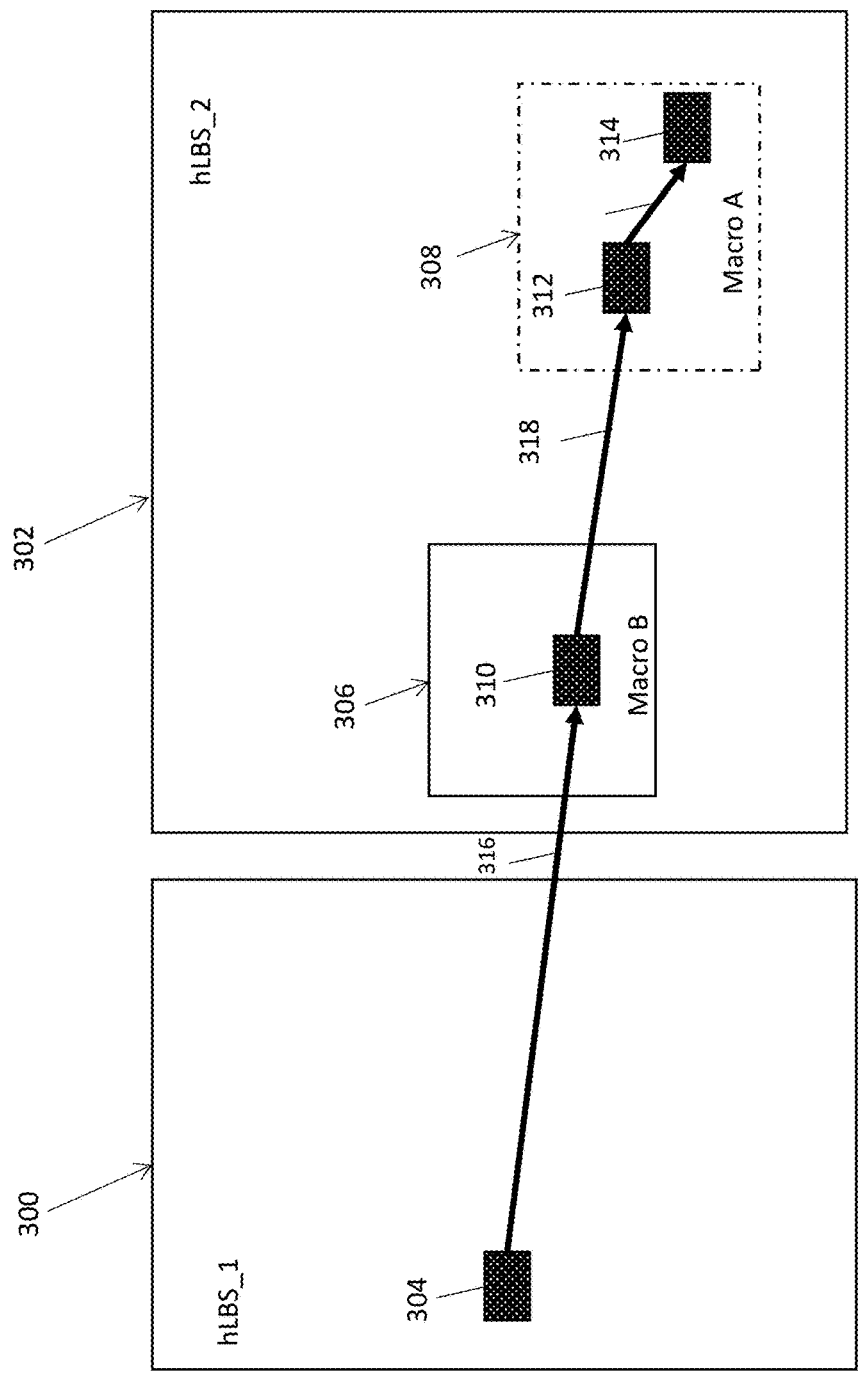
FIG. 5 depicts a first arrangement of placed latches in a Hierarchical Large Block Syntheses (hLBS) according to another non-limiting embodiment of the invention.

In addition to relocating a child latch into the parent macro containing the original child macro, a targeted child macro can be extracted from its original child macro and placed into a parent macro that excludes the original child macro. FIG. 5, for example, depicts an arrangement of placed latches in a Hierarchical Large Block Syntheses (hLBS) according to another non-limiting embodiment of the invention. Still referring to FIG. 5, a first parent-level hLBS 300 includes a first latch 304, while a second parent-level hLBS 302 includes two individual child macros 306 and 308. The first child macro 306 includes a first child latch 310 placed therein. The second child macro 308 includes a second child latch 312 and a third child 314 placed therein. The first child latch 310 is placed out of context with respect to the second child latch 312 and third child 314 latch. In addition, the first child latch 310 of the first child macro 306, along with the second and third child latches 312 and 314 of the second child macro 308 are placed out of context with respect to parent macros 300 and 302.

The child macros 306 and 308 are placed in their respective parent macro 302 and the latches 304, 310, 312 and 314 are connected via routing paths. For example, a first routing path 316 connects the first latch 304 included in the first parent macro 300 to the first child latch 310 included in the first child macro 306 of second parent macro 302. A second routing path 318 connects the first child latch 310 to the second child latch 312 included in the second child macro 308 of second parent macro 302. A third routing path 320 connects the second child macro latch 312 to the third child latch 314 included in the second child macro 308.

As described above, an optimization test is performed on the parent macros 300 and/or 302. Accordingly, the optimization test may determine that a timing imbalance is present at routing path 318, which connects the first child latch 310 and the second child latch 312. For instance, FIG. 5 shows that the length of the routing path 318 connecting the first child latch 310 placed in the first child macro 306 to the second child latch 312 placed in the second child macro 308 is greater than the length of the routing path 320 connecting the second and third child latches 312 and 314 placed in the second child macro 308. The difference in routing lengths can cause the timing imbalance detected when optimizing the second parent macro 302. Based on the optimization test, a target child macro (e.g., child macro 308) can be identified (indicated by the dashed outline) as having one or more child latches to be extracted therefrom and placed into its higher-level parent macro (e.g., parent macro 302).

Figure 6:
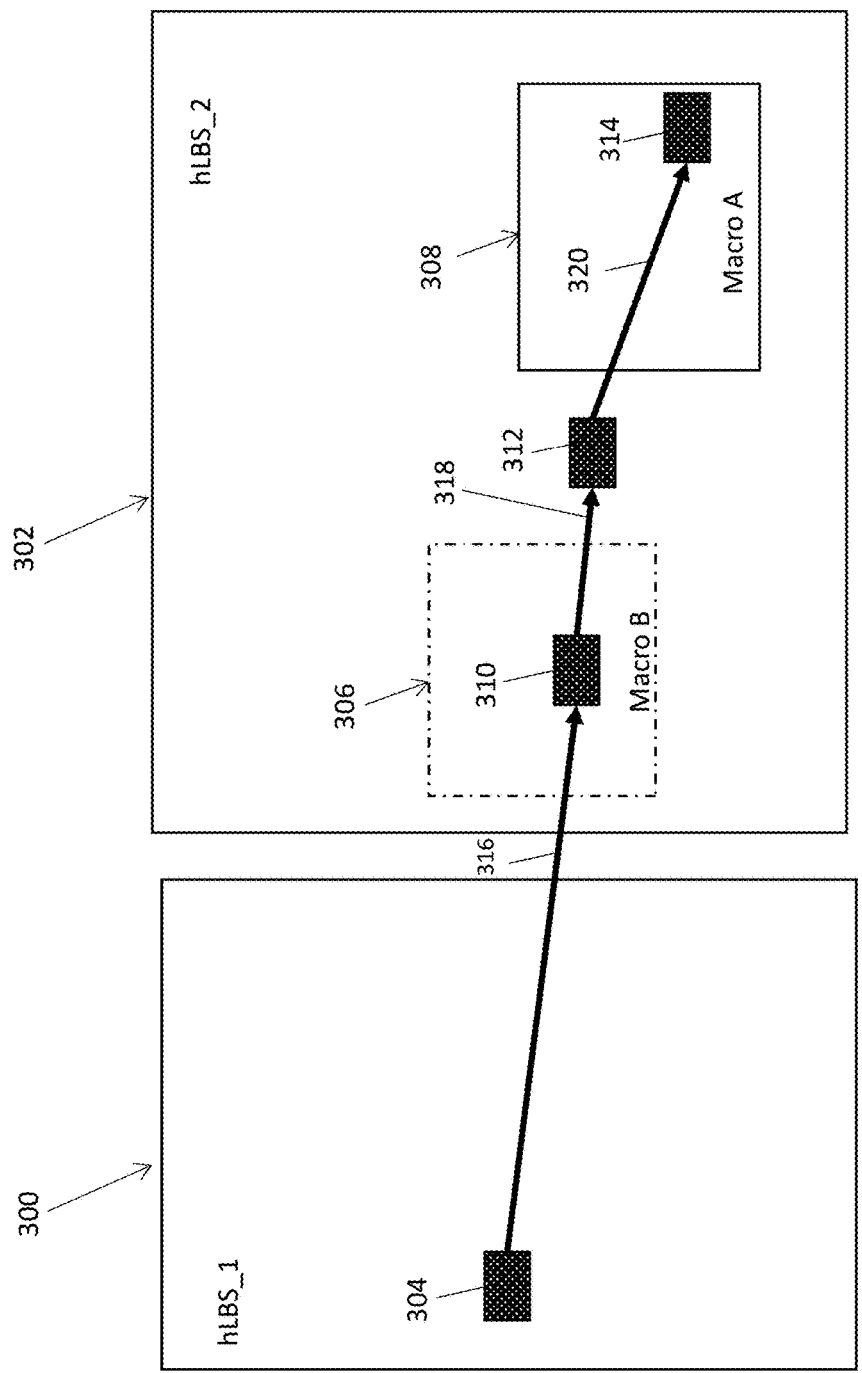
FIG. 6 depicts a second arrangement of placed latches in the hLBS after moving a latch from a child macro to a higher-level parent macro according to a non-limiting embodiment of the invention.

Referring to FIG. 6, the second parent macro 302 is illustrated after extracting the second child latch 312 from its originally placed child macro 308 (see FIG. 5). In other words, the second child latch 312 is pulled out of the second child macro 308 and placed into the higher-level second parent macro 302. Similar to the operations described in detail above, the second child latch 312 is placed such that the length of the second routing path 318 the length of the third routing path 320 are brought closer in line to one another, e.g., the lengths of the first and second routing paths 318 and 320 match or substantially match one another.

Figure 7:
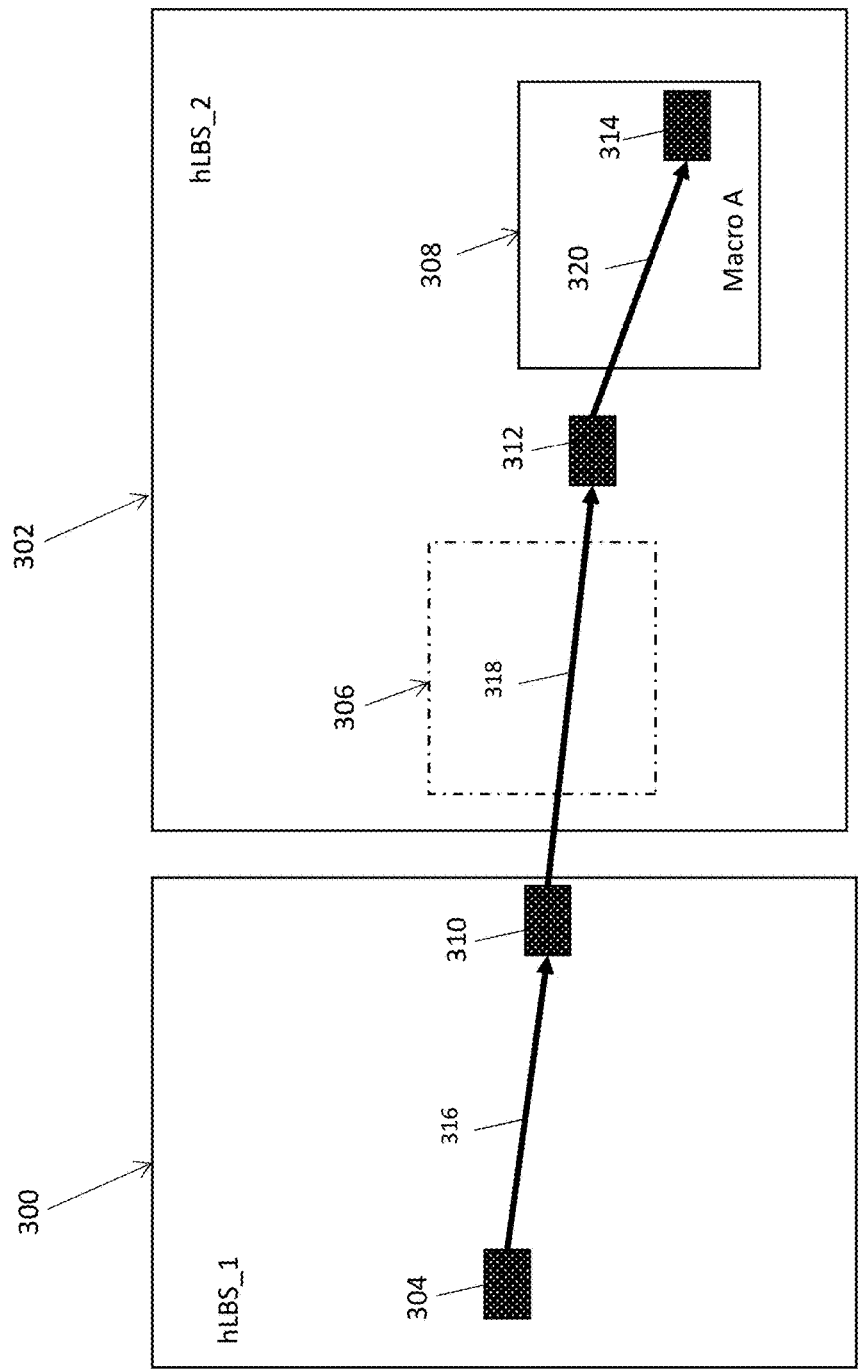
FIG. 7 depicts a third arrangement of placed latches in the hLBS after moving a latch from a first parent macro to a second parent macro according to a non-limiting embodiment of the invention.

Following extraction of the first child latch 312, however, a timing imbalance may still be detected, which is caused by the first routing path 316 connecting the first latch placed in the first parent macro 300 and the first child latch 310 placed in the first child macro 306 of the second parent macro 302. As shown in FIG. 7, the first child latch 310 is extracted from its original child macro 306. In this case, however, the extracted first child latch is placed in a different parent macro (e.g., the first parent macro 300) from the parent macro (e.g., the second parent macro 302) that contained its original child macro 306. The placement of the first child latch 310 in a parent macro (e.g., the first parent macro 300) allows it to be considered when performing optimization on the overall hLBS system (e.g., on both the first and second parent macros 300 and 302). Accordingly, the placement of the first child latch 310 in the first parent macro can be continuously adjusted such that lengths of the routing paths 316 and 318 are modified until the timing imbalance is resolved.

Figure 8A:
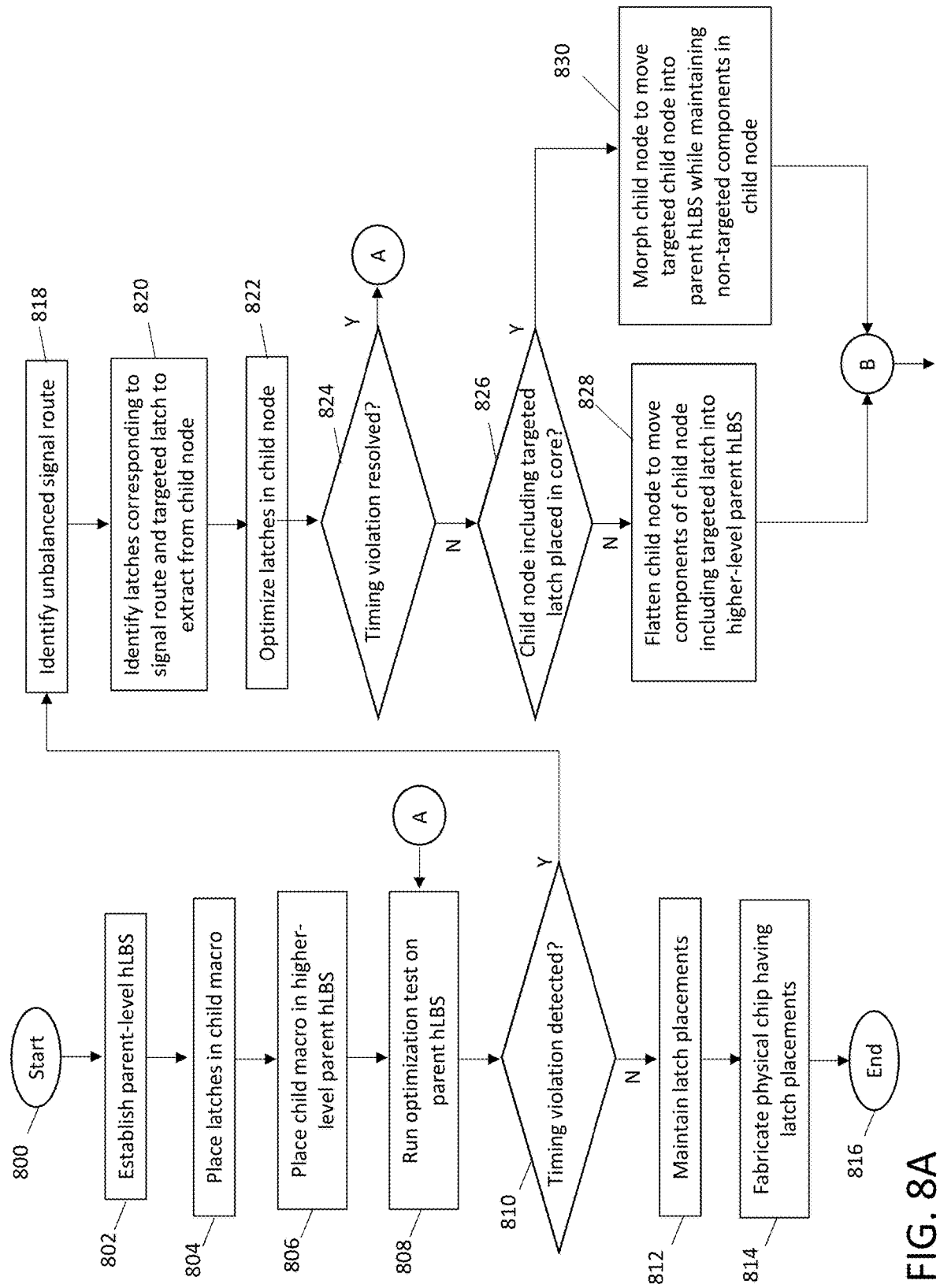
FIGS. 8A and 8B depict a flow diagram illustrating a method of balancing latch timings in an hLBS according to a non-limiting embodiment of the invention.
Figure 8B:
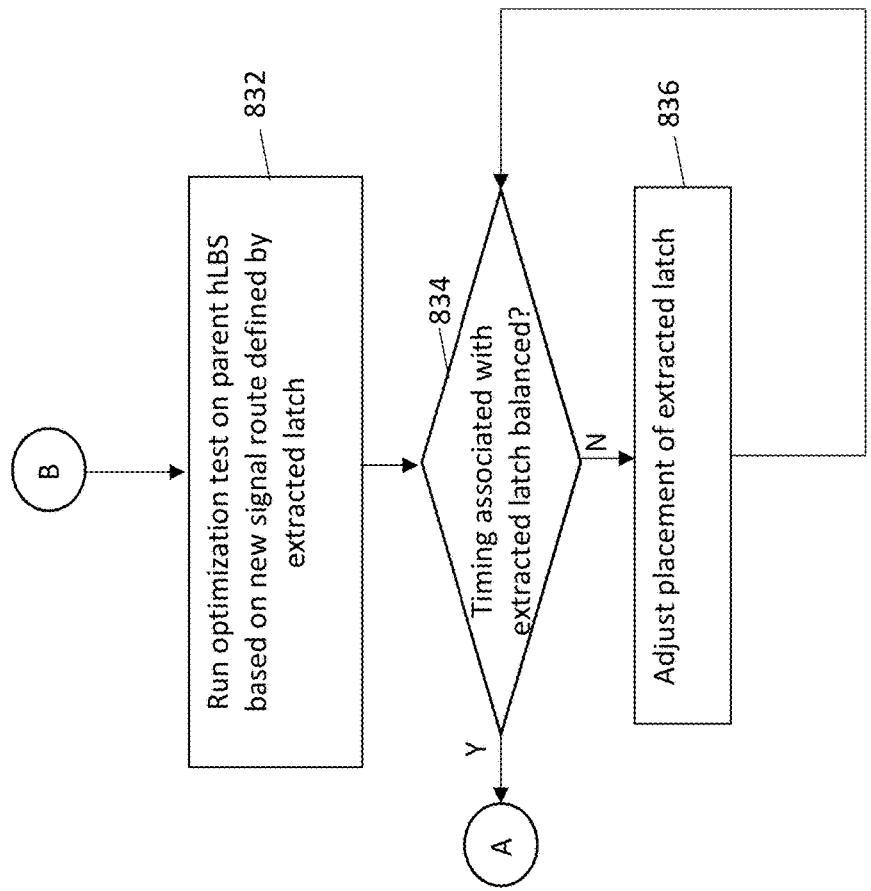

Turning now to FIGS. 8A and 8B, a flow diagram illustrates a method of balancing latch timings in an hLBS according to a non-limiting embodiment of the invention. The method begins at operation 800, and at operation 802 a parent-level macro of an hLBS is established. At operation 804, a plurality of logic circuit elements are placed in a child macro, i.e., a macro having a lower hierarchical level than the parent-level macro. The logic circuit elements include, but are not limited to, latches and logical gates. In one or more embodiments of the invention, the logic circuit elements are placed out-of-context with respect to the parent macro. That is, the logic circuit elements are designed, placed and routed in a given child macro without considering the design, routing and components of the higher-level parent macro. At operation 806, the child macro is placed in the parent macro, and at operation 808 an optimization test is performed on the parent macro. The optimization test can include, for example, timing violation tests, slack analysis, slew rate tests, static timing analysis tests, etc.

At operation 810, a determination is made as to whether a timing violation was detected in response to performing the optimization test on the parent macro. A timing violation can include, for example, failure of a signal to travel from one latch to another within a threshold amount of time. When a timing violation is not detected, placement of logic circuit elements in the child macro is maintained at operation 812. Accordingly, a physical implementation of the design (e.g., a physical chip) is fabricated at operation 814, and the method ends at operation 816.

When, however, a timing violation is detected at operation 810, the method identifies an unbalanced signal route causing the timing violation at operation 818 and identifies the logic circuit elements (e.g., latches) associated with the unbalanced signal route at operation 820. At operation 822, the logic circuit elements (e.g., latches) placed inside the child macro experiencing the unbalanced signal route are optimized. In one or more embodiments of the invention, the optimization of the logic circuit elements includes, for example, relocating and/or re-routing the logic circuit elements within the boundary of their child macro.

Turning to operation 824, a determination is made as to whether a timing violation was detected in response to performing the optimization test on the given child macro. When a timing violation is not detected, the process returns to operation 808 and performs an optimization test on the overall parent macro to ensure no further unbalanced signal routes exist. When, however, a timing violation is still detected after attempting to optimize the given child macro, the method moves to extract a targeted child logic circuit element from the child macro.

More specifically, a determination is made as to whether to extract just the targeted child logic circuit element, or entirely remove the hierarchical boundary by flattening the entire child macro. If just the single logic circuit element is to be pulled out, a first extraction operation (sometimes referred to as a "morphing operation") is performed, which extracts the targeted child logic circuit element from its child macro and places it in the higher-level parent macro while maintaining the remaining non-targeted logic circuit elements in the child macro. If the entire child macro boundary is to be removed, a second extraction operation (sometimes referred to as a flattening operation), which flattens the entire child macro into the higher-level parent macro. Unlike the morphing operation, the flattening operation places the entire contents (both the targeted logic circuit element and non-targeted circuit elements) into the higher-level parent macro.

In either case, the targeted child logic circuit element is now placed in the higher-level parent macro as opposed to being contained in its original child macro (which has a lower hierarchical level than the parent macro). Accordingly, an optimization test is run on the parent macro at operation 832. In this case, however, the optimization test run on the parent macro now takes into account the newly extracted logic circuit element.

At operation 834, an evaluation is made as to whether the timing associated with the extracted logic circuit element is balanced. The balanced timing can be determined based on various characteristics of the extracted timing circuit element including, but not limited to, slack analysis, rising/falling time analysis, signal routing time analysis, and static timing analysis. When the timing associated with the extracted logic circuit element is not balanced, the method adjusts the placement (i.e., moves the location of the extracted latch within the parent macro) at operation 836, and returns to operation to re-evaluate the timing of the extracted logic circuit based on its new placement location. The placement of the logic circuit element is continuously adjusted until the timing is balanced at operation 834.

When the timing is balanced at operation 834, returns to operation 808 and performs an optimization test on the overall parent macro to ensure no further unbalanced signal routes exist. Accordingly, when no further timing violations are detected at operation 810, the placement of logic circuit elements (including the newly extracted logic circuit element(s) maintained in the parent macro) is maintained at operation 812. The physical implementation of the design (e.g., a physical chip) is then fabricated at operation 814, and the method ends at operation 816. Fabrication can be performed by a foundry system that include one or more fabrication tools. The fabrication tools include, but are not limited to, stepper tools, photolithography tools, etching tools, cleaning tools, doping tools, and dicing tools.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of developing an integrated circuit, the method comprising:
    placing in a parent macro, via a computer processor, at least one child macro that contains therein at least one child logic circuit component, the parent macro having a first hierarchical level assigned thereto and the child macro having a second hierarchical level assigned thereto that is lower than the first hierarchical level assigned to the parent macro;
    detecting, via the computer processor, a timing fault in response to performing a first parent-level optimization process on the parent macro;
    extracting from the child macro, via the computer processor, a targeted logic circuit component from among the at least one child logic circuit component, and placing the targeted logic circuit component in the parent macro; and
    performing a second parent-level optimization process on the parent macro that resolves the timing fault based on the placement of the targeted logic circuit component in the parent macro.

2. The method of claim 1, further comprising having a physical integrated circuit fabricated that includes a physical implementation of the parent macro containing a physical implementation of the targeted logic circuit component.

3. The method of claim 2, further comprising:
    generating, via a computer processor, the parent macro in a hierarchical large block synthesis (hLBS) design of the integrated circuit; and
    generating, via the computer processor, the child macro and placing a plurality of logic circuit components in the child macro out of context with respect to the parent macro.

4. The method of claim 2, further comprising:
    performing, via the computer processor, a first timing analysis on the child macro prior to extracting the targeted logic circuit component;
    performing, via the computer processor, a child-level optimization process on the child macro based on the targeted logic circuit component,
    wherein the child-level optimization process is performed prior to the first parent-level optimization process.

5. The method of claim 4, further comprising extracting the targeted logic circuit component after detecting a timing fault responsive to performing the child-level optimization process.

6. The method of claim 5, wherein the child-level optimization process, the first parent-level optimization process, and the second parent level optimization process each include performing a slack analysis.

7. The method of claim 6, wherein the logic circuit component includes a latch.

8. A system to develop an integrated circuit, the system comprising:
    a child placement module configured to place in a parent macro at least one child macro that contains therein at least one child logic circuit component, the parent macro having a first hierarchical level assigned thereto and the child macro having a second hierarchical level assigned thereto that is lower than the first hierarchical level assigned to the parent macro,
    a timing analysis module configured to detect a timing fault in response to performing a first parent-level optimization process on the parent macro; and
    a component targeting module configured to extract from the child macro a targeted logic circuit component from among the at least one child logic circuit component, and to place the targeted logic circuit component in the parent macro,
    wherein the timing analysis module performs a second parent-level optimization process on the parent macro that resolves the timing fault based on the placement of the targeted logic circuit component in the parent macro.

9. The system of claim 8, further comprising a file generator module configured to generate a data file defining a synthesized implementation of the parent macro containing a physical implementation of the targeted logic circuit component.

10. The system of claim 9, wherein the parent macro in generated according to a hierarchical large block synthesis (hLBS) design of the integrated circuit, wherein a plurality of logic circuit components are placed in the child macro out of context with respect to the parent macro.

11. The system of claim 9, wherein the timing analysis module performs a first timing analysis on the child macro prior to extracting the targeted logic circuit component, and performs a child-level optimization process on the child macro based on the targeted logic circuit component, the child-level optimization process being performed prior to the first parent-level optimization process.

12. The system of claim 11, wherein the component targeting module extracts the targeted logic circuit component after detecting a timing fault responsive to performing the child-level optimization process.

13. The system of claim 12, wherein the child-level optimization process, the first parent-level optimization process, and the second parent level optimization process each include performing a slack analysis.

14. The system of claim 13, wherein the logic circuit component includes a latch.

15. A computer program product for developing an integrated circuit development, the computer program product comprising a non-transitory computer readable storage medium having program instructions embodied therewith, the program instructions executable by a processor to perform a method comprising:
    placing in a parent macro, via a computer processor, at least one child macro that contains therein at least one child logic circuit component, the parent macro having a first hierarchical level assigned thereto and the child macro having a second hierarchical level assigned thereto that is lower than the first hierarchical level assigned to the parent macro;
    detecting, via the computer processor, a timing fault in response to performing a first parent-level optimization process on the parent macro;
    extracting from the child macro, via the computer processor, a targeted logic circuit component from among the at least one child logic circuit component, and placing the targeted logic circuit component in the parent macro; and performing a second parent-level optimization process on the parent macro that resolves the timing fault based on the placement of the targeted logic circuit component in the parent macro.

16. The computer program product of claim 15, further comprising having a physical integrated circuit fabricated that includes a physical implementation of the parent macro containing a physical implementation of the targeted logic circuit component.

17. The computer program product of claim 16, further comprising:
   generating, via a computer processor, the parent macro in a hierarchical large block synthesis (hLBS) design of the integrated circuit; and
   generating, via the computer processor, the child macro and placing a plurality of logic circuit components in the child macro out of context with respect to the parent macro.

18. The computer program product of claim 16, further comprising:
   performing, via the computer processor, a first timing analysis on the child macro prior to extracting the targeted logic circuit component;
   performing, via the computer processor, a child-level optimization process on the child macro based on the targeted logic circuit component,
   wherein the child-level optimization process is performed prior to the first parent-level optimization process.

19. The computer program product of claim 18, further comprising extracting the targeted logic circuit component after detecting a timing fault responsive to performing the child-level optimization process.

20. The computer program product of claim 19, wherein the child-level optimization process, the first parent-level optimization process, and the second parent level optimization process each include performing a slack analysis, and wherein the logic circuit component includes a latch.

* * * * *